(12) United States Patent
Kondo

(10) Patent No.: US 7,372,600 B2
(45) Date of Patent: May 13, 2008

(54) COLOR FACSIMILE DEVICE WITH DATA RECOMPRESSING CAPABILITY

(75) Inventor: Yoshiyuki Kondo, Okazaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1147 days.

(21) Appl. No.: 10/669,726

(22) Filed: Sep. 25, 2003

(65) Prior Publication Data

US 2004/0160625 A1 Aug. 19, 2004

(30) Foreign Application Priority Data

Sep. 26, 2002 (JP) ............................. 2002-280960

(51) Int. Cl.
*H04N 1/32* (2006.01)
*H04N 1/41* (2006.01)

(52) U.S. Cl. ..................... 358/426.01; 358/426.02; 358/426.03; 358/426.14; 358/426.01; 382/239; 382/251

(58) Field of Classification Search ........... 358/426.01, 358/426.02, 426.03, 426.14; 382/239, 251
See application file for complete search history.

(56) References Cited

U.S. PATENT DOCUMENTS 6,542,640 B1 * 4/2003 Morihara et al. ........... 382/229

6,795,211 B1 * 9/2004 Eschbach et al. ............ 358/1.2
2002/0103676 A1 * 8/2002 Yamaguchi et al. ........... 705/3

FOREIGN PATENT DOCUMENTS

| JP | A 9-294264 | 11/1997 |
|---|---|---|
| JP | A11-243541 | 9/1999 |
| JP | A 11-243541 | 9/1999 |
| JP | A 2000-278349 | 10/2000 |
| JP | A2000-278349 | 10/2000 |
| JP | A 2001-61068 | 3/2001 |

* cited by examiner

*Primary Examiner*—Twyler Lamb Haskins
*Assistant Examiner*—Yixing Qin
(74) *Attorney, Agent, or Firm*—Oliff & Berridge, PLC

(57) ABSTRACT

JPEG data is efficiently recompressed and transmitted to a remote color facsimile device. Before transmission of recompressed JPEG data, an anticipated transmission time is displayed for enabling the user to easily select the desired compression ratio. To generate recompressed JPEG, a Huffman decoder is provided for decoding encoded data and temporarily generates decoded data. Table generator multiplies the predefined quantization table values by the prescribed value to generate the modified quantization table. Intermediate data generator generates the intermediate data by dividing the encoded data by ratio n, which is derived by dividing predefined quantization table by the modified quantization table. Huffman encoder encodes the intermediate data to create new encoded data. Recompressed JPEG data includes the newly coded data and the modified quantization table.

16 Claims, 7 Drawing Sheets

23A

DESTINATION PHONE NUMBER: 123-4567

PICT001.jpg TRANSMISSION

SELECT TRANSMISSION TIME

FINE ABOUT 6 min

NORMAL ABOUT 3 min

23B　　FAST ABOUT 2 min

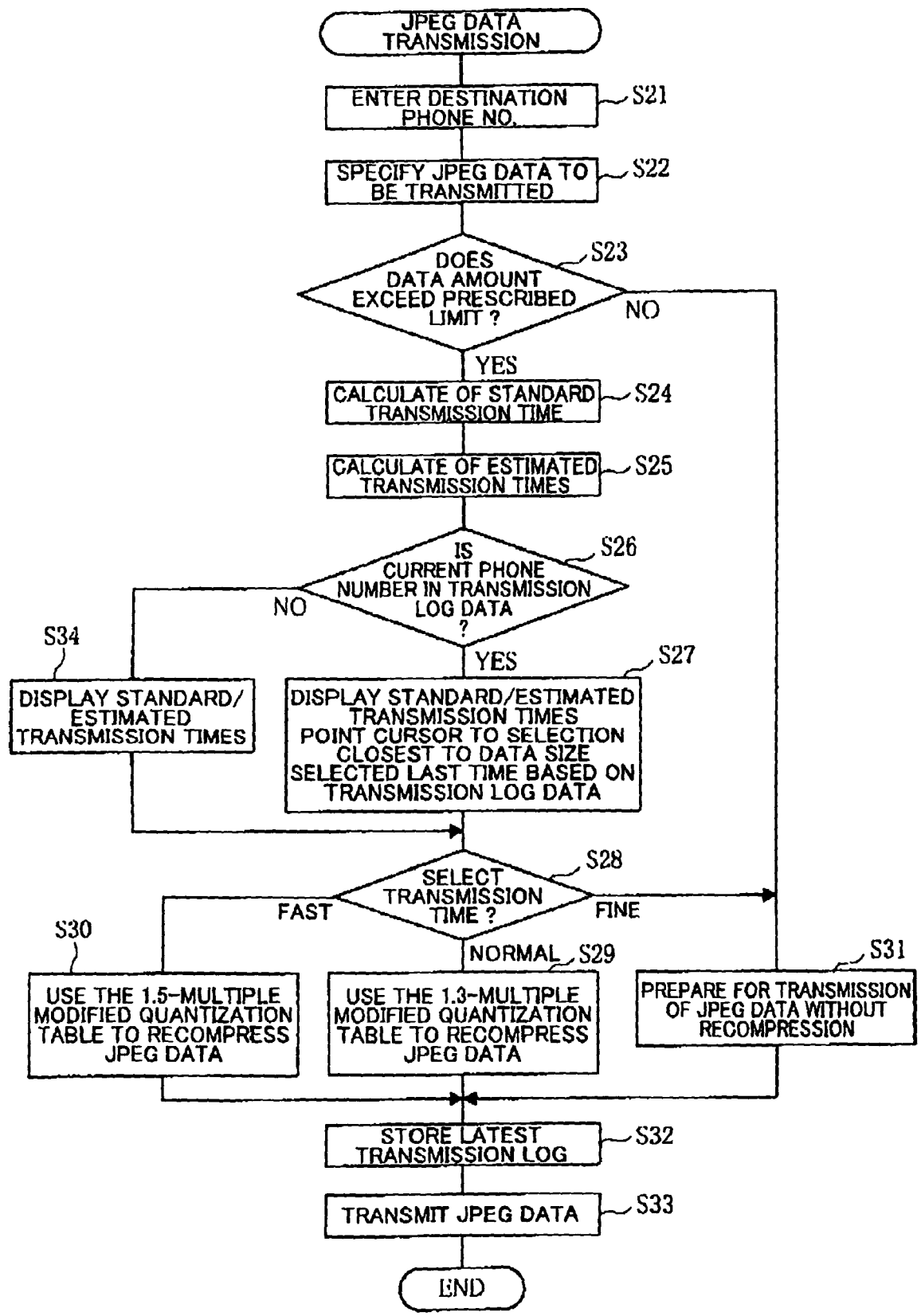

COLOR FACSIMILE DEVICE WITH DATA RECOMPRESSING CAPABILITY

BACKGROUND OF THE INVENTION

1. Field of the Invention

The present invention relates to a communication device and a communication method that enables recompression and transmission of JPEG data.

2. Description of the Related Art

Some conventional color facsimile devices adjust the JPEG compression ratio by selectively using quantization tables and are therefore provided with a variety of quantization tables. Japanese Patent Application Publication No. 2001-61068 discloses selecting a quantization table depending on the state of the used phone line in compressing a color image using JPEG and transmitting the resulting JPEG data to a remote facsimile device.

However, even a simple recompression of JPEG data involves a large number of quantization tables and requires that the entire compression procedure sequence be reversed to decompress the compressed image. Specifically, prior to recompression, the image data must be decompressed to restore the original image. Note that the decompressed data will differ slightly from original image data. Then, the most suitable quantization table has to be selected to perform JPEG recompression. Recompression performed according to this method is time-consuming and prevents efficient JPEG data transmission.

SUMMARY OF THE INVENTION

The present invention has been made to solve the above problem, and accordingly it is an object of the invention to provide communication devices and a communication method that enable quick and efficient recompression and transmission of JPEG data.

In order to achieve the above and other objects, the present invention provides a communication device connectable to and communicable with a remote communication device, which includes JPEG data retrieving means, recompressing means, and data transmission means. The PEG data retrieving means is provided for retrieving JPEG data including encoded data and a predefined quantization table The predefined quantization table contains a first set of numeral values arranged in an n-by-m matrix form wherein n and m are integers equal to or greater than two. The JPEG data is generated by compressing original data.

The recompressing means is provided for further compressing the JPEG data retrieved by the JPEG data retrieving means. The recompressing means includes decoding means, table generating means, intermediate data generating means, and encoding means. The decoding means is provided for decoding the encoded data and producing decoded data that contains a second set of numeral values arranged in the n-by-m matrix form. The table generating means is provided for generating a modified quantization table through multiplication of each of the numeral values in the predefined quantization table by a predetermined number. The modified quantization table contains a third set of numeral values arranged in the n-by-m matrix form. The intermediate data generating means is provided for generating intermediate data through division of each of the numeral values in the decoded data by the predetermined number. The intermediate data contains a fourth set of numeral values arranged in the n-by-m matrix form. The encoding means is provided for encoding the intermediate data and generating new encoded data. The new encoded data and the modified quantization table are defined as recompressed JPEG data.

The data transmission means is provided for transmitting to the remote communication device selective one of the JPEG data and recompressed JPEG data.

Preferably, the data communication device is applied to a color facsimile device.

The present invention also provides a communication method.

BRIEF DESCRIPTION OF THE DRAWINGS

In the drawings:

FIG. 7 is a flow chart illustrating JPEG data transmission procedures in accordance with another embodiment.

DETAILED DESCRIPTION OF THE PREFERRED EMBODIMENTS

Figure 1:
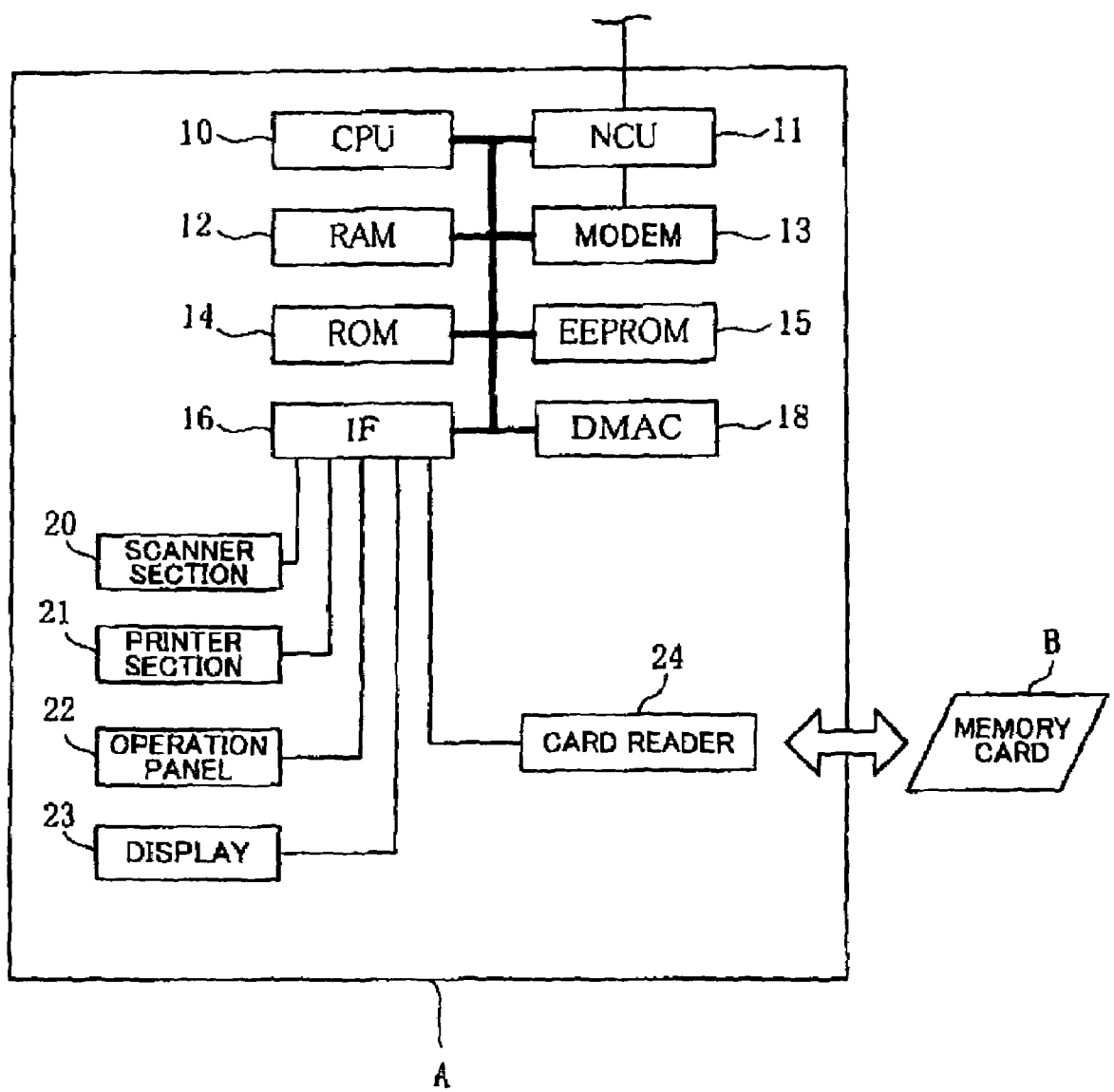
FIG. 1 is a block diagram illustrating the hardware configuration of a communication device in accordance with an embodiment of the present invention.

A color facsimile device according to the preferred embodiment of the invention will be described with reference to the accompanying drawings. FIG. 1 is a block diagram showing the hardware configuration of the communication device according to the embodiment of this invention. The communication device shown in FIG. 1 is a multi-function color facsimile device A having a printer, scanner, copier and phone functions in addition to the color facsimile function.

The color facsimile device A is connected to a public switched line (not shown). Color facsimile device A is provided with a slot (not shown) for inserting a memory card B used, for example, in digital cameras and other similar devices enabling compressed JPEG data saved on memory card B to be directly read out for transmission. The color facsimile device A provides a function for recompressing JPEG data and transmitting the resultant data. Incidentally, JPEG data on memory card B can be directly read out and printed.

Color facsimile device A includes CPU 10, NCU 11, RAM 12, modem 13, ROM 14, EEPROM 15, internal interface (IF) 16 and DMA controller (DMAC) 18, all of which are mutually connected by a bus. The color facsimile device A further includes scanner section 20, printer section 21, operation panel 22, display 23 and card reader 24, all of which are connected to the interface 16.

CPU 10 controls the overall operations of color facsimile device A. NCU 11 is connected to the public telephone network and controls the network. RAM 12 provides CPU 10 with work area and an area for storing data. Modem 13 modulates data transmitted by and demodulates data received by color facsimile device A. ROM 14 stores the programs executed by CPU 10. EEPROM 15 stores flags, data settings and other information. Internal interface 16 handles the exchanges of data and commands between CPU 10 and other components 20 to 24. DMA controller 18 serves as a bus arbiter directly controlling the reading of data from and writing data to RAM 12.

Scanner section 20 includes image sensors, an LED light source and other components to scan color images from documents. Printer section 21 performs color printing using ink jet or other printing system. Operation panel 22 provides, for example, key pad, cursor keys, send button and other function keys. Signals from each key is transferred to CPU 10 via internal interface 16. Display 23, which is, for example, an LCD, shows various information under the control of CPU 10. Card reader 24 reads JPEG data stored on memory card B and transmits this data to CPU 10 via internal interface 16.

Figure 2:
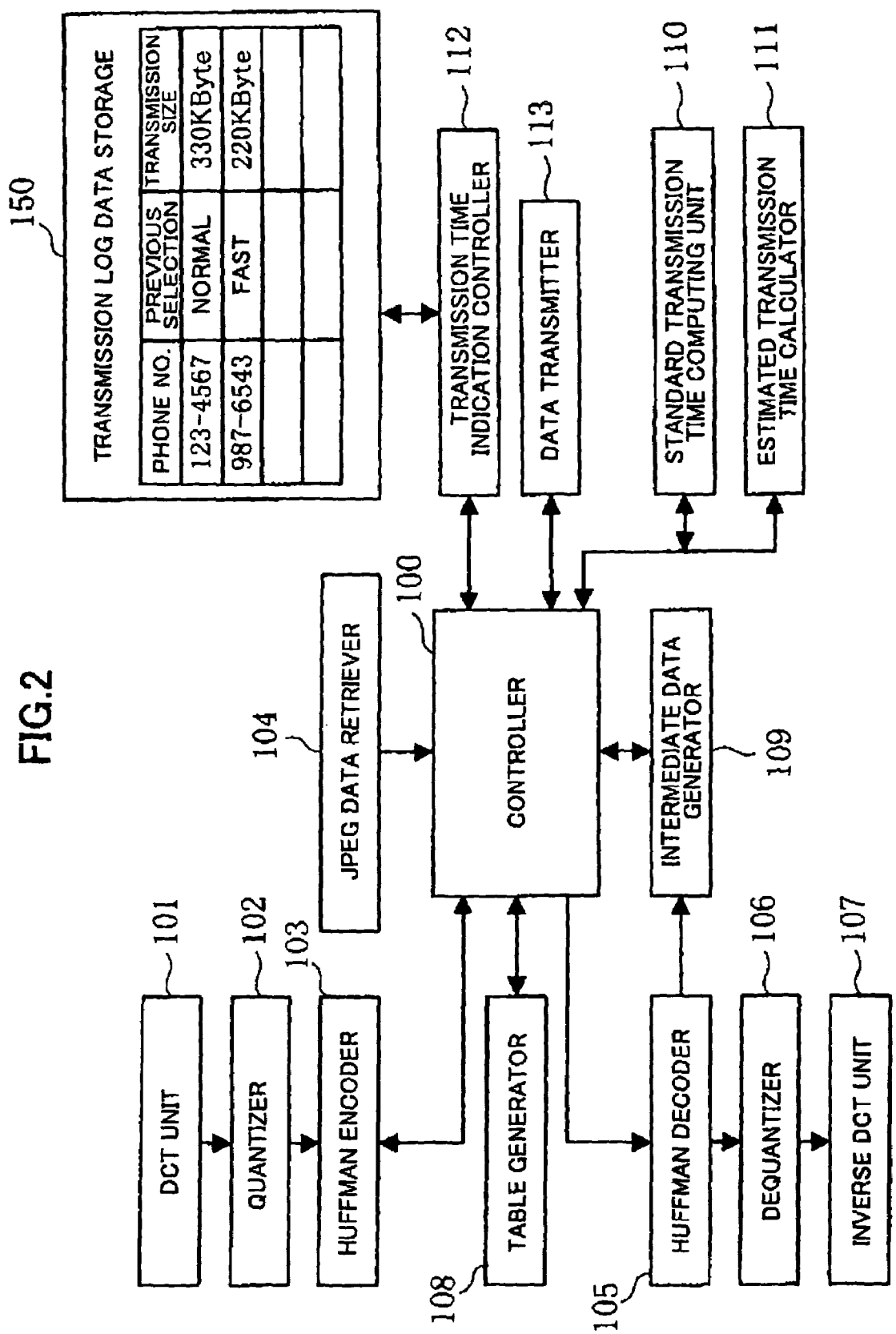
FIG. 2 is a block diagram illustrating JPEG compression and decompression functions.
Figure 3:
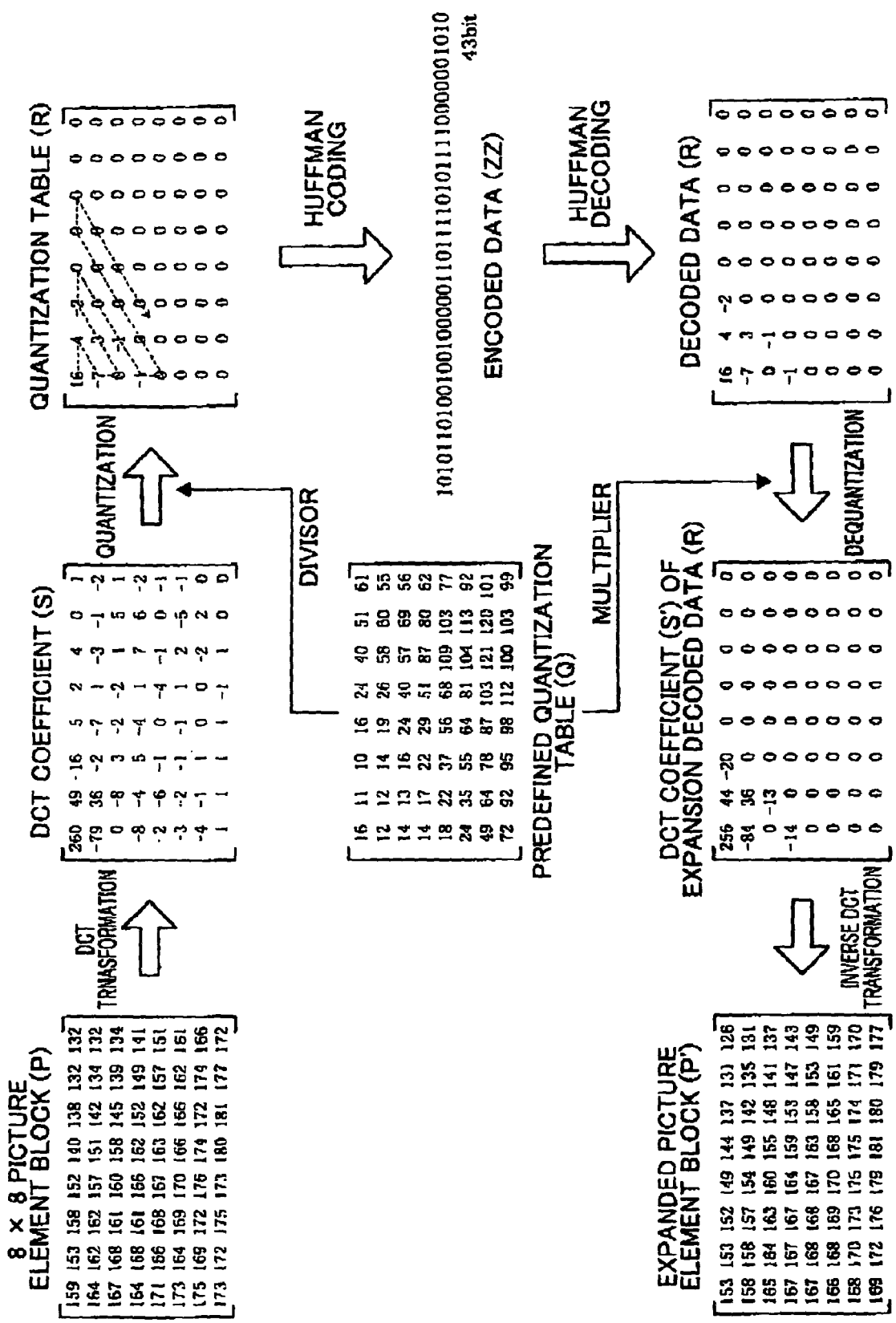
FIG. 3 is a diagram describing the basic principle of JPEG compression and decompressing.
Figure 4:
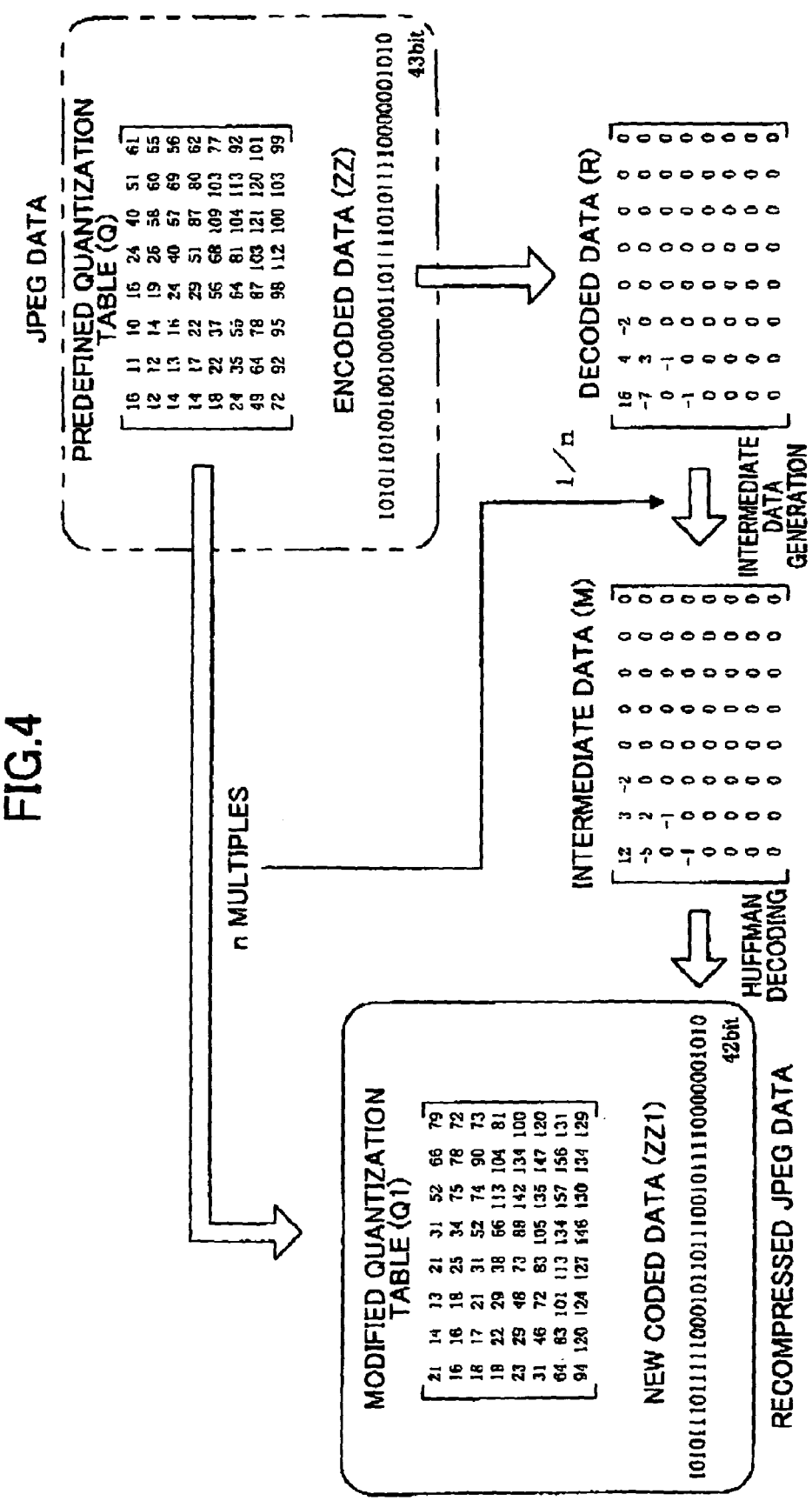
FIG. 4 is a diagram describing procedures to decompress JPEG data.

A block diagram in FIG. 2 illustrates JPEG compression/expansion functions. FIG. 3 is an explanatory diagram describing basic JPEG compression/expansion. FIG. 4 is an explanatory diagram describing how JPEG data is recompressed.

JPEG compression/expansion functions include controller 100, which performs a central role, Discrete Cosine Transform (DCT) unit 101, quantizer 102, Huffman encoder 103, JPEG data retriever 104, Huffman decoder 105, dequantizer 106, inverse DCT unit 107, table generator 108, intermediate data generator 109, standard transmission time computing unit 110, estimated transmission time calculator 111 transmission time indication controller 112, data transmitter 113 and transmission log data storage 150. Of these functions transmission log data storage 150 is implemented by EEPROM 15, while other functions are mainly implemented by CPU 10.

In JPEG compression, DCT unit 101, as shown in FIG. 3, performs discrete cosine transformation, for example, on 8-by-8 picture element block P fetched from the original image data, such as image data of a photo or the like. 8-by-8 picture element block P is composed of luminance and color difference based on a YcbCr color space wherein Y indicates luminance; Cb, color difference indicating the amount of blue; and Cr, color difference indicating the amount of red. Simply stated, DCT transforms the value of each picture element representing luminance components or color difference components that make up the 8-by-8 picture element block to frequency components. The data obtained through DCT is referred to as DCT coefficient S.

Next, quantizer 102 uses predefined quantization table Q to quantize DCT coefficient S. In this quantization, each value of DCT coefficient S is divided by corresponding value in predefined quantization table Q and the resulting values are rounded off to produce the final quantization values. The data obtained in this way is referred to as quantization data R. The processing used in quantization does not involve complex matrix processing but performs simple division of values in the corresponding rows and columns.

Finally, Huffman encoder 103 performs Huffman encoding of quantization data R in zig-zag scan order as indicated by the dashed lines in FIG. 3 to produce compressed and encoded data ZZ. Simply stated, Huffman coding assigns long bit strings to low-frequency values (for example, "16" or "4" of quantization data R, and short bit strings to high-frequency values (for example, "0" of quantization data R). JPEG data is composed of the finally obtained encoded data ZZ and the predefined quantization table Q.

JPEG data retriever 104 reads JPEG data stored on memory card B (as compressed JPEG data) and transfers it to controller 100. JPEG data retriever 104 also transfers JPEG data received as color facsimile data "as is" to controller 100. Here "as is" indicates that standard JPEG YcbCr color space is not converted or expanded but transferred as JPEG data. Of course, the JPEG data handled by JPEG data retriever 104 includes encoded data ZZ and predefined quantization table Q.

JPEG decompression is performed by reversing the compression process described above to expand (decompress) JPEG data. Thus Huffman decoder 105 takes the encoded data ZZ that make up JPEG data and decodes it by performing the Huffman encoding in reverse. This process produces decoded data R whose values are identical to quantization data R mentioned above. For this reason, the decoded data and quantization data are both indicated by the symbol "R".

Next, dequantizer or reverse quantizer 106 dequantizes decoded data R using predefined quantizer table Q with JPEG data. This dequantization reverses quantization of decoded data R values and is achieved by multiplying values in the predefined quantization table Q values to the corresponding values in the decoded data R. Data obtained this way are referred to as expanded DCT coefficient (S'). The reverse quantization process does not use complex matrix processing, but simply multiplies corresponding row and column values.

Finally, inverse DCT unit 107 converts the expanded DCT coefficient (S') values to picture elements using inverse DCT to produce reconstructed (decompressed) expanded picture element block P'. As shown in FIG. 3, the picture element values of expanded picture element block P' are for the most part identical to the original 8-by-8 picture element block P meaning that loss of image quality due to JPEG compression is hardly noticeable to the human eye.

The following sections will describe JPEG compression of data already compressed using JPEG compression.

In recompressing JPEG data, as shown in FIG. 4, Huffman decoder 105 temporarily creates decoded data R using the above-described process of decompressing the JPEG data. Table generator 108 fetches predefined quantization table Q from JPEG data and multiplies predefined quantization table Q values by n (>1) to generate modified quantization table Q1 FIG. 4 shows an example of modified quantization table Q1 resulting from multiplying predefined quantization table Q values by 1.3.

Intermediate data generator 109 generates intermediate data M by dividing decoded data R values by ratio n, which is derived by dividing modified quantization table Q1 by predefined quantization table Q. Thus intermediate data M is obtained by multiplying decoded data R values by inverse number 1/n of ratio n and rounding off the result. Multiplying by inverse number 1/n of ratio n is the same as dividing by ratio n. Intermediate data M without rounding off can be expressed by the mathematical formula: $M=R\times 1/n$. Since $n=Q1/Q$, this value can be substituted for n to produce: $M=R\times Q/Q1$. "R×Q" means multiplying decoded data R values by predefined quantization table Q values. Thus intermediate data M is the same as dividing expanded DCT coefficient (S') values by modified quantization table Q1 values obtained by dequantizing (×Q) decoded data R and rounding off the result. In other words, intermediate data M is obtained by decoding only the Huffman code rather than completely expanding JPEG data. Intermediate data M generated in this way can be considered as a further quantization and compression of quantization data R. The compression ratio thus increases in proportion to an increase in ratio n derived by dividing modified quantization table Q1 by predefined quantization table Q values.

In the last phase of recompression, intermediate data M mentioned above is encoded by Huffman encoder 103 to produce new encoded data ZZ1. As shown by the example in FIG. 4, encoded data ZZ1 is made up of fewer bits (42-bit data) than that of encoded data ZZ (43-bit data) indicating that data volume can be decreased without entirely expanding JPEG data. Controller 100 uses new encoded data ZZ1 and modified quantization table Q1 to perform JPEG recompression and sends the resulting JPEG compression data to data transmitter 113. Data transmitter 113 controls that the recompressed JPEG data is transferred "as is" to the party designated by the user in accordance with the color facsimile communications protocol. Here "as is" indicates that recompressed JPEG data is transmitted without converting color spaces made up of standard JPEG YCbCr data. Data transmitter 113 also allows the user to send JPEG data without recompression.

Prior to transmission of JPEG data or recompressed JPEG data, standard transmission time computing unit 110 calculates the time required for standard transmission (referred to as "standard transmission time") based on facsimile transmission speed (normally 14400 bits/s) as dictated by the color facsimile communications protocol and the amount of JPEG data prior to JPEG recompression. The standard transmission time is typically derived by dividing data volume obtained when JPEG data is read from memory card B by facsimile transmission speed. For example, if JPEG data volume is 420 Kbyte and the transmission speed is 14400 bits/s, the standard transmission time is roughly four minutes.

Estimated transmission time calculator 111 calculates the time required for transmitting recompressed JPEG data (referred to as "estimated transmission time"). This estimated transmission time calculation uses the above standard transmission time and ratio n prescribed by JPEG recompression. Since the compression ratio increases with an increase in ratio n, the estimated transmission time is reduced in proportion as ratio n is increased. Estimated transmission time calculator 111 indicates a mathematical formula in the above assessment and the relationship between standard transmission time and ratio n makes it possible to produce a rough estimate of the estimated transmission time. For example, if the standard transmission time is 6 minutes and the ratio is 1.3, the estimated transmission time is ½ of standard transmission time or about three minutes. If the ratio is 1.5 for the same standard transmission time, the estimated transmission time is ⅓ of standard transmission time or about two minutes. The amount of recompressed JPEG data is estimated by dividing the estimated transmission time by the transmission speed.

Transmission time indication controller 112 can be set to indicate the standard transmission time, estimated transmission time described above and other data on display 23. The display shows standard transmission time (about six minutes), reduced estimated transmission time (about three minutes) and further reduced estimated transmission time (about two minutes) in order from the longest transmission time. The display can also show "Fine", "Normal", "Fast" or other image quality or speed priority selections. For JPEG data without recompression. "Normal" mode recompresses JPEG data using a ratio of 1.3 while the "Fast" mode recompresses JPEG data using a ratio of 1.5 before transmission. When the user selects one of these modes on operation panel 22 using the cursor keys or other input device, data transmitter 113 controls the transmission of JPEG data or recompressed JPEG data according to user choice. Transmission time indication controller 112 displays a screen for selecting transmission time and other parameters only when the amount of JPEG data exceeds the prescribed level. When the amount of JPEG data is comparatively small, data transmitter 113 transmits the JPEG data without recompression.

When JPEG data or recompressed JPEG data has been transmitted as described above, controller 100 stores the phone number of the other party, selected mode, transmission data amount (of each transmission) as transmission log data in transmission log data storage 150. The transmission log data is updated each time JPEG data or recompressed JPEG data is transmitted Thus next time a transmission is made to a destination in the transmission log, previously selected mode or transmission time selected for a transmission data amount appears as the first choice.

The following is a description of JPEG data transmission procedures.

Figure 5:
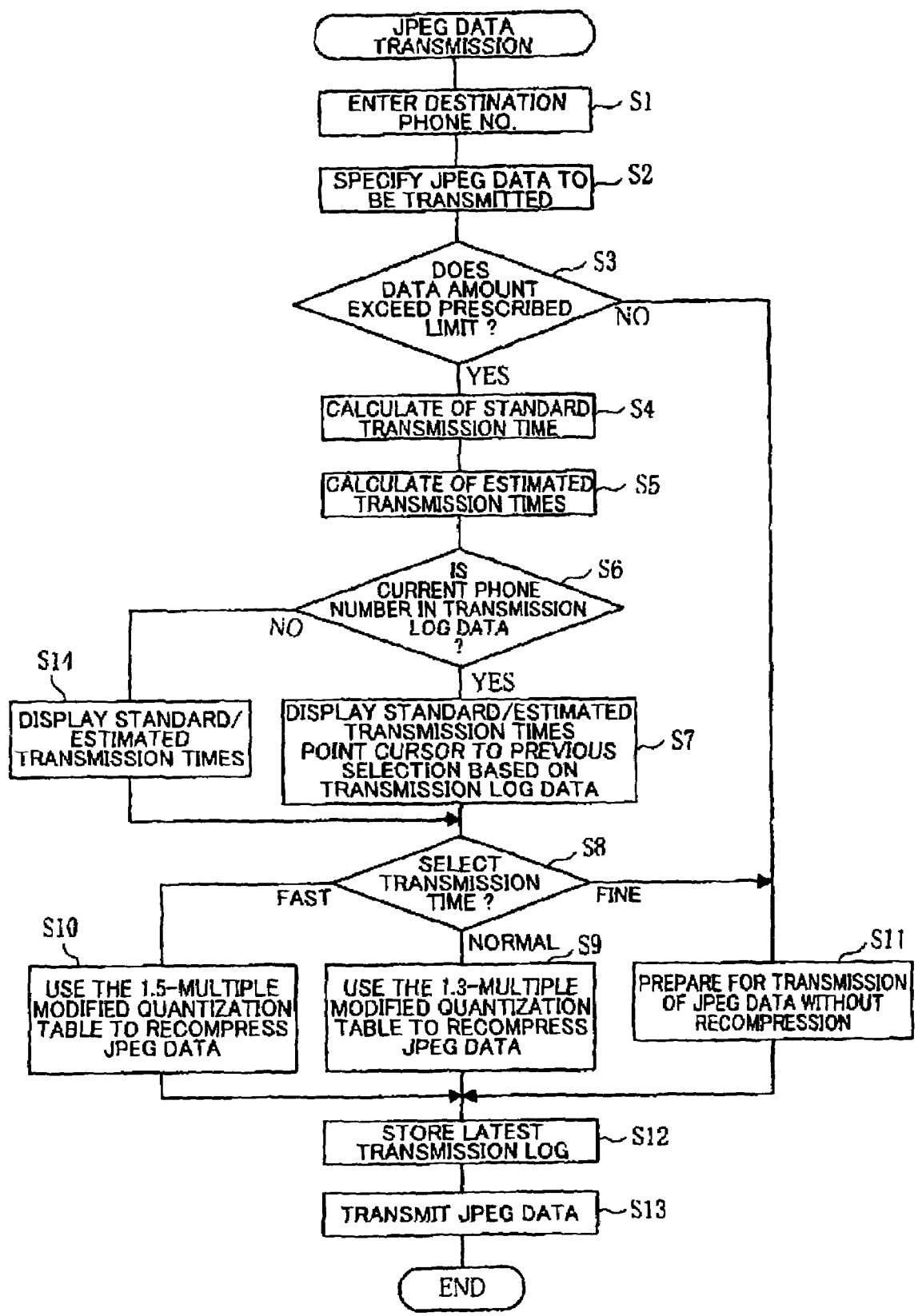
FIG. 5 is a flow chart illustrating JPEG data transmission processing procedures.
Figure 6:
FIG. 6 is a diagram describing display screens.

FIG. 5 is a flow chart showing JPEG data transmission procedures while FIG. 6 shows a display screen example.

The user first enters a phone number (S1). If the user then selects JPEG data on memory card B for transmission (S2), CPU 10 reads the specified JPEG data from memory card B and checks whether or not the amount of specified JPEG data exceeds a prescribed limit.

If JPEG data exceeds the prescribed limit (S3: YES), CPU 10 calculates the standard transmission time based on data amount and the selected transmission speed (for example, 14400 bits/s) (S4). If the data amount is 660 Kbyte, the standard transmission time will be about six minutes. Note that CPU 10 may skip process S3 and proceed directly from S2 to S4.

CPU 10 presets ratio n as a value derived by dividing modified quantization table Q1 by predefined quantization table Q. CPU 10 uses the n ratio and the standard transmission time (see above) to calculate the estimated transmission time (S5). For example, if the standard transmission time is about six minutes and ratio n is 1.3, estimated transmission time becomes three minutes while a ratio n of 1.5 results in a transmission time of two minutes.

When a phone number entered in S1 corresponds to a phone number in the transmission data log (S6: YES), CPU 10 causes display 23 to show the standard transmission time (six minutes), estimated transmission times (about three or two minutes) and "Fine", "Normal" and "Fast" modes corresponding to each transmission time in screen 23A (see FIG. 6). In addition, CPU 10 causes cursor 23B to point to the mode selected the previous time (S7). FIG. 6 indicates that "Normal" mode was selected to transmit recompressed JPEG data in the previous transmission to this phone number.

If the user selects "Normal" mode, here an estimated transmission time of about three minutes, in screen 23A (S8: "Normal"), CPU 10 recompresses the JPEG data using a ratio of 1.3 to generate recompressed JPEG data (S9). Since cursor 23B already points to the mode that was selected for this phone number in the previous transmission, all the user needs to do is to press the Send button again. Thus the user need not select the transmission time or make other settings each time a transmission is made to a specific destination.

If the user selects "Fast" mode, here an estimated transmission time of about two minutes (S8: "Fast"), CPU 10 recompresses the JPEG data using a ratio n of 1.5 to generate recompressed JPEG data (S10). To do this, the user has to move cursor 23B to the position for "Fast" and finalize this selection. Recompressed JPEG data generated in this way is now ready for transmission.

If the user selects "Fine", a standard transmission time of six minutes (S8: "Fine"), CPU 10 transmits the JPEG data without recompression (S11). Again, the user has to move cursor 23B, this time to the position for "Fine" and finalize this selection.

When a mode and transmission time is selected as described above, CPU 10 stores the latest transmission log data for selected conditions in EEPROM 15 (S12).

Finally, CPU 10 transmits the selected JPEG or recompressed JPEG data (S13) to complete the processing sequence. At this time, CPU 10 transmits the data without converting the YCbCr color space of JPEG or recompressed JPEG data. The receiving color facsimile device employs the JPEG decompression method described above to produce color prints with an image quality that corresponds to the transmitted data amount by reconstructing JPEG data or recompressed JPEG data.

When the phone number entered in S1 is not found in the transmission log data (S6: NO), CPU 10 displays the standard transmission time (about six minutes) and estimated transmission times (about three and two minutes) in screen 23A of display 23. This screen also shows the corresponding modes; "Fine", "Normal" and "Fast". Cursor 23B selects "Fine" by default (S14). CPU 10 then proceeds to S8.

When JPEG data does not exceed the prescribed data limit (S3: NO), CPU 10 does not recompress the data but proceeds to S11.

This embodiment thus removes the need for color facsimile device A to perform JPEG decompression up to the final inverse DCT conversion before recompressing JPEG data. Instead, a modified quantization table Q1 whose ratio n is larger than 1, is generated from predefined quantization table Q1 (whose ratio is 1). A simple recalculation of ratio n, modified quantization table Q1 and intermediate data M, makes it possible for the user to efficiently recompress JPEG data and reduce transmission times.

Standard transmission time for JPEG data that is not recompressed and the estimated transmission times for data that is recompressed are easily obtained using the above ratio n allowing the user to easily select the desirable transmission time after recompression.

The following sections describe another embodiment of the present invention. FIG. 7 is a flow chart describing JPEG transmission procedures in accordance with another embodiment. Since this chart is identical to FIG. 5 except for S27, only S27 will be described.

S26 shows what happens when a phone number entered in S21 is identical to a phone number stored in the transmission log data (S26: YES). CPU 10 then displays the standard transmission time (about six minutes) and the estimated transmission times (about three and two minutes) calculated in S24 and S25 in screen 23A on display 23. CPU 10 also displays modes "Fine", "Normal" and "Fast" that correspond to those transmission times and places cursor 23B pointing to the mode that most closely matches the choice made for data amount sent to same phone number the previous time (527). A simple example would be sending the same JPEG data as last time. If this data was then recompressed and transmitted as "Normal" last time, cursor 23B in screen 23A will point to "Normal" this time, too, as the mode that corresponds to the data amount sent last time. Subsequent processes are the same as those shown in FIG. 5.

For example, if the user selects the "Normal" mode, an estimated transmission time of about three minutes (S28: "Normal") in screen 23A, CPU 10 recompresses JPEG data using a ratio of 1.3 (S29). Since cursor 23B points to the mode that results in the same data amount as selected the previous time, the user only has to press the Send button once. Thus when about the same amount of data is sent to the same destination, there is no need to select modes.

Thus as described above, JPEG data can be efficiently compressed and transmitted also in other embodiments, and the user can easily select one of the anticipated transmission, times after recompression.

While the invention has been described in detail with reference to specific embodiments thereof, it would be apparent to those skilled in the art that various changes and modifications may be made therein without departing from the spirit of the invention, the scope of which is defined by the attached claims. For example, color facsimile A described above could be connected to a personal computer to recompress and transmit JPEG data received from the computer. Original image data obtained from scanner 20 could first be stored in memory as JPEG data before being recompressed and transmitted.

The user could be given a single recompression choice and any recompression of JPEG data could be made using a single predetermined ratio n. Or, the JPEG data could be recompressed without involving user intervention.

Transmission times could be displayed in terms of image and speed priorities such as "Fine", "Normal" and "Fast", rather than a time value. Or, transmission times could be displayed in terms of standard transmission time and estimated transmission times.

FIG. 6 shows both image qualities such as "Fine", "Normal" and "Fast", as well as speeds. This could be unified either under image quality: "High quality", "Normal" and "Low"; or transmission time: "Slow", "Normal" and "Fast"

What is claimed is:

1. A communication device connectable to and communicable with a remote communication device, comprising:
   JPEG data retrieving means for retrieving JPEG data including encoded data and a predefined quantization table that contains a first set of numeral values arranged in an n-by-m matrix form wherein n and m are integers equal to or greater than two, the JPEG data being generated by compressing original data;
   recompressing means for further compressing the JPEG data retrieved by the JPEG data retrieving means, the recompressing means comprising:
      decoding means for decoding the encoded data and producing decoded data that contains a second set of numeral values arranged in the n-by-m matrix form;
      table generating means for generating a modified quantization table through multiplication of each of the numeral values in the predefined quantization table by a predetermined number, the modified quantization table containing a third set of numeral values arranged in the n-by-m matrix form;
      intermediate data generating means for generating intermediate data through division of each of the numeral values in the decoded data by the predetermined number, the intermediate data containing a fourth set of numeral values arranged in the n-by-m matrix form; and
      encoding means for encoding the intermediate data and generating new encoded data, the new encoded data and the modified quantization table being defined as recompressed JPEG data; and
   data transmission means for transmitting to the remote communication device selective one of the JPEG data and recompressed JPEG data.

2. The communication device according to claim 1, further comprising:

standard transmission time calculating means for calculating a standard transmission time required for transmission of the JPEG data to the remote communication device based on an amount of the JPEG data and a predetermined transmission speed;

estimated transmission time calculating means for calculating an estimated transmission time required for transmission of the recompressed JPEG data to the remote communication device based on the predetermined number and the standard transmission time; and transmission time display control means for displaying the standard transmission time and the estimated transmission time as options for selection by an operator, wherein the data transmission means transmits to the remote communication device the JPEG data when the operator selects the standard transmission time and the recompressed JPEG data when the operator selects the estimated transmission time.

3. The communication device according to claim 2, further comprising transmission log data storing means for storing transmission log data indicating actual transmission time in past transmission to the remote communication device, wherein the transmission time display control means displays as a default setting either the standard transmission time or the estimated transmission time whichever is closer to the actual transmission time in the past transmission to the same remote communication device.

4. The communication device according to claim 2, further comprising transmission log data storing means for storing transmission log data indicating an amount of data transmitted in past to the remote communication device, the amount of data being calculated based on an actual transmission time and the predetermined transmission speed, wherein the transmission time display control means displays as a default setting either the standard transmission time or the estimated transmission time selected in terms of an amount of data transmitted during the standard transmission time and the estimated transmission time whichever is closer to the amount of data transmitted in the past transmission to the same remote communication device.

5. The communication device according to claim 2, wherein the transmission time display control means displays the standard transmission time and the estimated transmission time only when an amount of the JPEG data exceeds a predetermined amount.

6. A color facsimile device connectable to and communicable with a remote color facsimile device, comprising:

JPEG data retrieving means for retrieving JPEG data including encoded data and a predefined quantization table that contains a first set of numeral values arranged in an n-by-in matrix form wherein n and m are integers equal to or greater than two, the JPEG data being generated by compressing original data;

recompressing means for further compressing the JPEG data retrieved by the JPEG data retrieving means, the recompressing means comprising:

decoding means for decoding the encoded data and producing decoded data that contains a second set of numeral values arranged in the n-by-in matrix form;

table generating means for generating a modified quantization table through multiplication of each of the numeral values in the predefined quantization table by a predetermined number, the modified quantization table containing a third set of numeral values arranged in the n-by-in matrix form;

intermediate data generating means for generating intermediate data through division of each of the numeral values in the decoded data by the predetermined number, the intermediate data containing a fourth set of numeral values arranged in the n-by-m matrix form; and encoding means for encoding the intermediate data and generating new encoded data, the new encoded data and the modified quantization table being defined as recompressed JPEG data; and data transmission means for transmitting to the remote color facsimile device selective one of the JPEG data and recompressed JPEG data.

7. The color facsimile device according to claim 6, further comprising:

standard transmission time calculating means for calculating a standard transmission time required for transmission of the JPEG data to the remote color facsimile device based on an amount of the JPEG data and a predetermined transmission speed;

estimated transmission time calculating means for calculating an estimated transmission time required for transmission of the recompressed JPEG data to the remote color facsimile device based on the predetermined number and the standard transmission time; and transmission time display control means for displaying the standard transmission time and the estimated transmission time as options for selection by an operator, wherein the data transmission means transmits to the remote color facsimile device the JPEG data when the operator selects the standard transmission time and the recompressed JPEG data when the operator selects the estimated transmission time.

8. The color facsimile according to claim 7, further comprising transmission log data storing means for storing transmission log data indicating actual transmission time in past transmission to the remote color facsimile device, wherein the transmission time display control means displays as a default setting either the standard transmission time or the estimated transmission time whichever is closer to the actual transmission time in the past transmission to the same remote color facsimile device.

9. The color facsimile device according to claim 7, further comprising transmission log data storing means for storing transmission log data indicating an amount of data transmitted in past to the remote color facsimile device, the amount of data being calculated based on an actual transmission time and the predetermined transmission speed, wherein the transmission time display control means displays as a default setting either the standard transmission time or the estimated transmission time selected in terms of an amount of data transmitted during the standard transmission time and the estimated transmission time whichever is closer to the amount of data transmitted in the past transmission to the same remote color facsimile device.

10. The color facsimile device according to claim 7, wherein the transmission time display control means displays the standard transmission time and the estimated transmission time only when an amount of the JPEG data exceeds a predetermined amount.

11. The color facsimile device according to claim 7, wherein the JPEG data retrieving means comprises a card reader for reading the JPEG data stored in a memory card.

12. A method of communicating with a remote communication device, comprising the steps of:

retrieving JPEG data including encoded data and a predefined quantization table that contains a first set of numeral values arranged in an n-by-in matrix form wherein n and m are integers equal to or greater than two, the JPEG data being generated by compressing original data;

further compressing the JPEG data by decoding the encoded data and producing decoded data that contains a second set of numeral values arranged in the n-by-m matrix form, generating a modified quantization table through multiplication of each of the numeral values in the predefined quantization table by a predetermined number, the modified quantization table containing a third set of numeral values arranged in the n-by-m matrix form, generating intermediate data through division of each of the numeral values in the decoded data by the predetermined number, the intermediate data containing a fourth set of numeral values arranged in the n-by-m matrix form, and encoding the intermediate data and generating new encoded data, the new encoded data and the modified quantization table being defined as recompressed JPEG data; and transmitting to the remote communication device selective one of the JPEG data and recompressed JPEG data.

13. The method according to claim 12, further comprising the steps of:

calculating a standard transmission time required for transmission of the JPEG data to the remote communication device based on an amount of the JPEG data and a predetermined transmission speed;

calculating an estimated transmission time required for transmission of the recompressed JPEG data to the remote communication device based on the predetermined number and the standard transmission time; and displaying the standard transmission time and the estimated transmission time as options for selection by an operator, wherein the JPEG data is transmitted to the remote communication device when the operator selects the standard transmission time and the recompressed JPEG data is transmitted to the remote communication device when the operator selects the estimated transmission time.

14. The method according to claim 13, further comprising the steps of storing transmission log data indicating actual transmission time in past transmission to the remote communication device, wherein either the standard transmission time or the estimated transmission time is displayed as a default setting whichever is closer to the actual transmission time in the past transmission to the same remote communication device.

15. The method according to claim 13, further comprising the steps of storing transmission log data indicating an amount of data transmitted in past to the remote communication device, the amount of data being calculated based on an actual transmission time and the predetermined transmission speed, wherein either the standard transmission time or the estimated transmission time is selected as a default setting in terms of an amount of data transmitted during the standard transmission time and the estimated transmission time whichever is closer to the amount of data transmitted in the past transmission to the same remote communication device.

16. The method according to claim 13, wherein the standard transmission time and the estimated transmission time are displayed only when an amount of the JPEG data exceeds a predetermined amount.

* * * * *